United States Patent Office 3,708,472
Patented Jan. 2, 1973

3,708,472
PROCESS FOR CLEAVING 2-NITROCYCLO-HEXANONE USING 6-AMINOCAPROIC ACID AS A CATALYST
Philip M. Pivawer, Hamden, Conn., assignor to The Techni-Chem Company, Wallingford, Conn.
No Drawing. Filed Oct. 14, 1970, Ser. No. 80,814
Int. Cl. C07d 41/06
U.S. Cl. 260—239.3 A     8 Claims

ABSTRACT OF THE DISCLOSURE 2-nitrocyclohexanone is cleaved in the presence of 6-aminocaproic acid as a catalyst. 6-nitrocaproic acid is produced which can be reduced with hydrogen to 6-aminocaproic acid and the latter cyclized to caprolactam by heating in fairly dilute aqueous solution, less than 25%. The caprolactam formation is an equilibrium reaction and some aminocaproic acid remains, which can be separated and used as a catalyst in the cleavage of the 2-nitrocyclohexanone.

RELATED APPLICATIONS AND BACKGROUND OF THE INVENTION

An improved process for preparing caprolactam starting from cyclohexanone has been developed by the assignee of the present application. Essentially the sequence of steps involves the formation of cyclohexanone enol acetate, nitration to produce 2-nitrocyclohexanone, cleaving the nitrocyclohexanone in aqueous solution in the presence of a basic catalyst, such as ammonia, to produce 6-nitrocaproic acid or 6-nitrocaproamide or mixtures, depending on reaction conditions. These products are then reduced with hydrogen to 6-aminocaproic acid or caproamide, which compounds are then cyclized to caprolactam by heating in dilute aqueous solution, 5% to 25%. While the final yield of caprolactam is substantially quantitative, it is produced in an equilibrium with some 6-aminocaproic acid which is separated therefrom. An overall continuous process of the steps above referred to forms the subject matter of a Pat. No. 3,562,254, Feb. 9, 1971, of Sheehan, Vellturo, Gay, Hegarty & Threlkeld. Individual steps are also covered by applications of one or more of the above inventors, of which the cleavage of the 2-nitrocyclohexanone using a basic catalyst forms the subject matter of an application of Sheehan and Vellturo, Ser. No. 774,208, filed Nov. 27, 1968, which is a continuation-in-part of earlier application, and the step of cyclizing 6-aminocaproic acid or caproamide to caprolactam is the subject matter of the Sheehan Pat. 3,485,821, Dec. 23, 1969. All of these applications and the patent are owned by the assignee of the present application.

Although the cleavage step of 2-nitrocyclohexanone, referred to above, can be effected with a very high yield approaching quantitative, the ammonium hydroxide used in the cleavage has to be separated and the separation may involve some loss. Even though there is no loss, the separation involves a step which requires additional equipment and operating costs, as is set out in the Pat. 3,562,254, referred to above. It is with an improvement in the cleavage step or in the cleavage reduction and cyclization to caprolactam that the present application deals. The present application is not concerned with the steps of producing an enol acetate from cyclohexanone and transforming this compound into 2-nitrocyclohexanone.

SUMMARY OF THE INVENTION

In the present invention the cleavage step of the 2-nitrocyclohexanone is effected with an amino acid, and preferably 6-aminocaproic acid, as a catalyst instead of ammonium hydroxide. Best results in the cleavage were formerly thought to require a basic catalyst, such as ammonium hydroxide. The present invention, where aminocaproic acid is used as the cleavage catalyst and which of course is a compound that is not basic as it contains a carboxylic acid group as well as the amino group, gives just as high yields as the basic ammonium hydroxide hitherto considered necessary for best results. At the time the invention was made it was not known why aminocaproic acid, which is not a basic compound such as ammonium hydroxide, formerly considered necessary to the cleavage, gives such high yield. We do not know the exact mechanism which makes this quite different type of compound so effective, and therefore the present invention is not intended to be limited to any particular theory of why the improved results in the cleavage reaction take place.

Among the advantages which constitute the improvements of the present invention are the high yields with small amounts of aminocaproic acid, even as low as 0.1%, instead of the much larger amount of ammonium hydroxide which is normally in excess of the nitrocyclohexanone, e.g. 5% to 10% excess, as is generally described in the Pat. 3,562,254, and the elimination of the necessity of recovering large amounts of ammonia, which while feasible and practical as described in the same patent, nevertheless requires additional procedural steps and equipment and so additional cost.

Although the amount of 6-aminocaproic acid may be quite small, i.e. catalytic amounts, as has been referred to above, the invention is not limited to using so small an amount of 6-aminocaproic acid. Larger amounts can be used with excellent results, and since the compound is one which is used to cyclize to caprolactam, after reducing the nitrocaproic acid with hydrogen, it does not have to be separated, thus eliminating a step which was necessary when the cleavage of the nitrocyclohexanone was effected with ammonium hydroxide. This effects an important saving in the number of steps required and equipment required and so reduces cost without adversely affecting the yields or the purities of the final products. In other words, the present invention effects important improvements without any offsetting drawbacks, and it is not a compromise, as is so often the case where an improved process may be well worthwhile but does involve drawbacks which partially offset its advantages.

While in its broader aspects the invention is not limited to any particular source of 6-aminocaproic acid, in a preferred modification the 6-aminocaproic acid is obtained from the cyclization step because, as is described in the Sheehan patent above referred to and the allowed application, the cyclization produces an equilibrium of caprolactam with some uncyclized 6-aminocaproic acid in aqueous solution. When this 6-aminocaproic acid is used in the cleavage reaction of the present invention, this constitutes a circulating load in the preferred modification of the process and eliminates entirely the necessity of adding a reagent, ammonium hydroxide. It will be noted that the preferred modification of the present invention utilizes unreacted 6-aminocaproic acid or part of it from the cyclization step. Of course in the final cyclization step a separation of lactam from unreacted 6-aminocaproic acid still has to be made, but this separation has to be made in any event, and the present invention therefore does not involve any additional separation step or any greater size of separation equipment. This is thus an additional advantage of the preferred modification of the invention, in which the 6-aminocaproic acid is obtained as a part of a combined process ending up with caprolactam.

The concentration of aminocaproic acid in the cleavage reaction is not at all critical. In general concentrations from 0.1% to 10% are used, with a preferred range of between 1% and 7%. Even larger amounts of 6-aminocaproic acid may be used as increasing concentrations of aminocaproic acid over a considerable range results in a somewhat faster cleavage. As the amount of 6-aminocaproic acid is very considerably less than that of the 2-nitrocyclohexanone, in the claims this will be referred to as a catalytic amount. This use of the term is quite common where the amount added is much less than stoichiometric, and it is not intended to refer to minute amounts which are sometimes used in other catalytic reactions.

The temperature range which can be used is very wide, from room temperature to as high as 200° C. As is common in organic reactions, the reaction rate increases with higher temperatures, and so a preferred range involves moderate heating, temperatures between 40° and 100° C. giving excellent results. The fact that the temperature over a very wide range is not critical represents an operating advantage in a practical process.

In the preferred modification of the present invention the process starting with 2-nitrocyclohexanone and ending with caprolactam can be operated as a continuous process, as is described in the allowed application. The present invention, however, is not limited to any particular equipment design, although, of course, any equipment used in a process step must be suitable for the conditions of the step.

In the cleavage reaction a small amount of an imine by-product is produced, but this gradually disappears to a negligible amount as the reaction continues.

DESCRIPTION OF THE PREFERRED EMBODIMENTS

The invention will be described in greater detail in conjunction with the following specific examples:

EXAMPLE 1

6-aminocaproic acid (26.2 g.) was added to 1000 cc. of water and the solution heated to 70° C. Next 143 g. (1 mole) of 2-nitrocyclohexanone was added all at once. The temperature was held at 70° during the reaction period. After 18 minutes the solution became homogeneous.

The disappearance of 2-nitrocyclohexanone and formation and disappearance of the imine derived from 2-nitrocyclohexanone and aminocaproic acid was measured by UV analysis.

| Time, mins. | Percent nitro ketone | Conversion | Percent imine | Percent conversion to imine |
|---|---|---|---|---|
| 18 | .927 | 92.5 | .340 | 2.8 |
| 34 | .30 | 97.5 | | |
| 41 | | | .186 | 1.52 |
| 65 | | | .110 | .90 |
| 125 | | | .032 | .256 |

A total of 38 g. of solution was removed for analysis and titration of the solution with $NH_4OH$ indicated a 99.5% yield of 6-aminocaproic acid. The remaining product solution weighing 1156.2 g. was reduced at 300 p.s.i.g. in a Parr bomb at 50° to 100° C. over a 2.5 hour period. The catalyst (25 g.) was 10% Pd on charcoal water wet. Analysis of the reduction solution showed an 86.3% yield of 6-aminocaproic acid. The yield of oligomer was 7.9% for an overall yield of 94.2%.

EXAMPLE 2

The product of Example 1 was cyclized by heating in 5% to 20% aqueous solution at temperatures from 240° to 300° C. The reaction was carried out in a steel bomb for one hour at 240° C., the bomb was then rapidly cooled, and the aqueous solution extracted three times with equal parts of chloroform based on the water content. The chloroform was then separated and evaporated, the product being caprolactam. The aqueous phase contained from about 10% to about 30% unreacted 6-aminocaproic acid and was the source of 6-aminocaproic acid in the cleavage step. The amount of unreacted aminocaproic acid depends on the initial concentration of the aminocaproic acid in water. Variations with concentration and times which were obtained in a series of tests carried out as described above are shown in the following table:

| Parts amino acid per 100 parts $H_2O$ | Time, mins. | Temp., ° C. | Conversion, percent of theory |
|---|---|---|---|
| 20 | 60 | 240 | 70 |
| 15 | 60 | 240 | 74 |
| 5 | 60 | 240 | 80 |
| 20 | 60 | 260 | 77 |
| 15 | 60 | 260 | 84 |
| 5 | 60 | 260 | 90 |
| 20 | 45 | 280 | 83 |
| 15 | 45 | 280 | 88 |
| 5 | 45 | 280 | 90 |
| 20 | 30 | 300 | 88 |
| 15 | 15 | 300 | 90 |

EXAMPLE 3

To 3.27 g. of 6-aminocaproic acid in 100 cc. of distilled water at 45° C. was added 14.3 g. (0.1 mole) of 2-nitrocyclohexanone. The temperature was increased to 80° C. over a 15-minute period, after which the solution became homogeneous. The pH of the solution was 4.5. An additional 100 cc. of water was added and with the temperature at 55° C., 14.3 g. (0.1 mole) of 2-nitrocyclohexanone was added. The temperature was increased to 70° C. and the solution was homogeneous after 10 minutes. After an additional hour a sample was titrated with ammonium hydroxide which showed a 97% yield of 6-nitrocaproic acid. The solution was extracted with chloroform, the chloroform extract dried over magnesium sulfate, filtered, and the chloroform evaporated. The infrared spectrum of the residue was superimposable on that of an authentic sample of 6-nitrocaproic acid.

EXAMPLE 4

A number of tests were made as described in general in Example 1 using various temperatures and various amounts of 6-aminocaproic acid. These tests also measured the speed of reaction as measured by the time required to form a homogeneous solution of 6-aminocaproic acid. The results are shown in the following table:

| Weight of 2-nitrocyclohexanone, g. | Weight of 6-aminocaproic acid, g. | $H_2O$, cc. | Temp., ° C. | Time for homogeneity, mins. |
|---|---|---|---|---|
| 14.3 | 3.3 | 100 | 45–80 | 15 |
| 14.3 [1] | | ¹ 100 | 55–70 | 10 |
| 143 | 65.5 | 1,000 | 70 | 5 |
| 143 | 26.2 | 1,000 | 70 | 18 |
| 143 | 13.1 | 1,000 | 70 | 46 |

¹ Additional.

I claim:

1. A process of cleaving 2-nitrocyclohexanone to 6-nitrocaproic acid which comprises heating the nitrocyclohexanone, under acid condition in aqueous dispersion, in the presence of a dilute solution of 6-aminocaproic acid in water at temperatures from about room temperature to 200° C., the amount of aminocaproic acid based on the nitrocyclohexanone being a catalytic amount and the concentration in the reaction medium being not less than about 0.1% nor more than 10%.

2. A process according to claim 1 in which the temperature is between 40° C. and 100° C.

3. A process according to claim 2 in which the concentration of 6-aminocaproic acid is between 1% and 7%.

4. A process according to claim 1 in which the concentration of 6-aminocaproic acid is between 1% and 7%.

5. A process according to claim 1 in which the 6-nitrocaproic acid is reduced with hydrogen at temperatures from 50° to 100° C. in the presence of a hydrogenation catalyst to transform the 6-nitrocaproic acid produced into 6-aminocaproic acid, cyclizing the 6-aminocaproic acid thus produced by heating at temperatures from 150° to 350° C. in aqueous solution containing from 5% to 25% of the 6-aminocaproic acid, whereby caprolactam is produced in the presence of unreacted 6-aminocaproic acid, the caprolactam is separated and at least a portion of the 6-aminocaproic acid constitutes the 6-aminocaproic acid used in cleaving the 2-nitrocyclohexanone.

6. A process according to claim 2 in which the 6-nitrocaproic acid is reduced with hydrogen at temperatures from 50° to 100° C. in the presence of a hydrogenation catalyst to transform the 6-nitrocaproic acid produced into 6-aminocaproic acid, cyclizing the 6-aminocaproic acid thus produced by heating at temperatures from 150° to 350° C. in aqueous solution containing from 5% to 25% of the 6-aminocaproic acid, whereby caprolactam is produced in the presence of unreacted 6-aminocaproic acid, the caprolactam is separated and at least a portion of the 6-aminocaproic acid constitutes the 6-aminocaproic acid used in cleaving the 2-nitrocyclohexanone.

7. A process according to claim 3 in which the 6-nitrocaproic acid is reduced with hydrogen at temperatures from 50° to 100° C. in the presence of a hydrogenation catalyst to transform the 6-nitrocaproic acid produced into 6-aminocaproic acid, cyclizing the 6-aminocaproic acid thus produced by heating at temperatures from 150° to 350° C. in aqueous solution containing from 5% to 25% of the 6-aminocaproic acid, whereby caprolactam is produced in the presence of unreacted 6-aminocaproic acid, the caprolactam is separated and at least a portion of the 6-aminocaproic acid constitutes the 6-aminocaproic acid used in cleaving the 2-nitrocyclohexanone.

8. A process according to claim 4 in which the cleaved 2-nitrocyclohexanone is reduced with hydrogen at temperatures from 50° to 100° C. in the presence of a hydrogenation catalyst to transform the 6-nitrocaproic acid produced into 6-aminocaproic acid, cyclizing the 6-aminocaproic acid thus produced by heating at temperatures from 150° to 350° C. in aqueous solution containing from 5% to 25% of the 6-aminocaproic acid, whereby caprolactam is produced in the presence of unreacted 6-aminocaproic acid, the caprolactam is separated and at least a portion of the 6-aminocaproic acid constitutes the 6-aminocaproic acid used in cleaving the 2-nitrocyclohexanone.

References Cited
UNITED STATES PATENTS

| | | | |
|---|---|---|---|
| 3,485,821 | 12/1969 | Sheehan | 260—239.3 A |
| 3,560,484 | 2/1971 | Tanaka et al. | 260—239.3 A |
| 3,562,254 | 2/1971 | Sheehan | 260—239.3 A |

OTHER REFERENCES

Matlack et al., "J. Org. Chem," vol 32, pp. 1995–1996 (June 1967).

ROBERT T. BOND, Assistant Examiner

U.S. Cl. X.R.

260—526 S, 534 R